Nov. 15, 1955 C. S. RUDEEN 2,723,871
AUTOMATIC TWINE KNOTTING MECHANISM
Filed Jan. 23, 1953 3 Sheets-Sheet 3
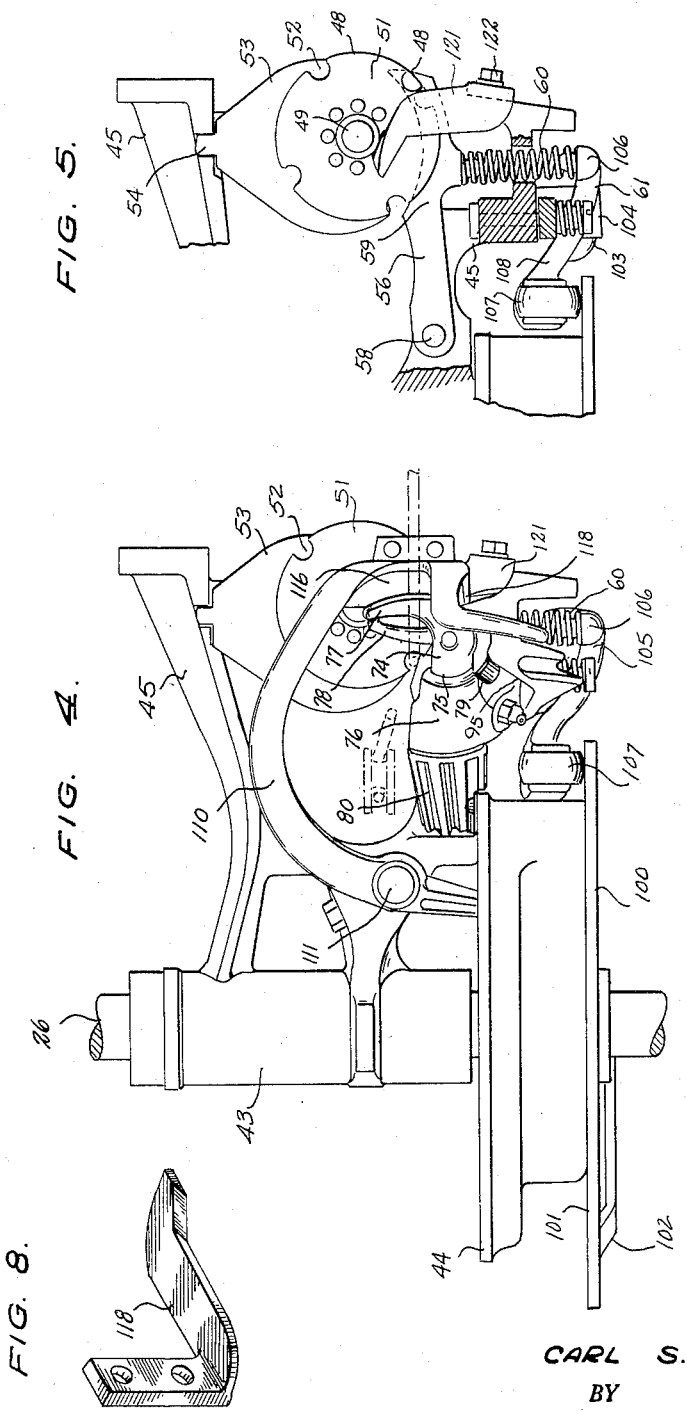
INVENTOR.
CARL S. RUDEEN,
BY
McMorrow, Berman + Davidson
ATTORNEYS.

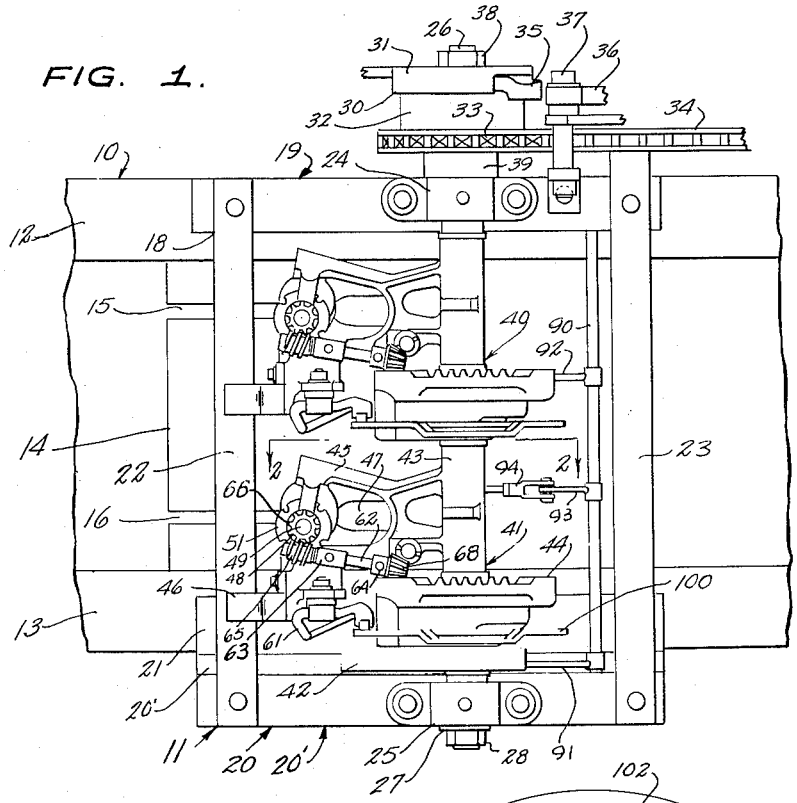

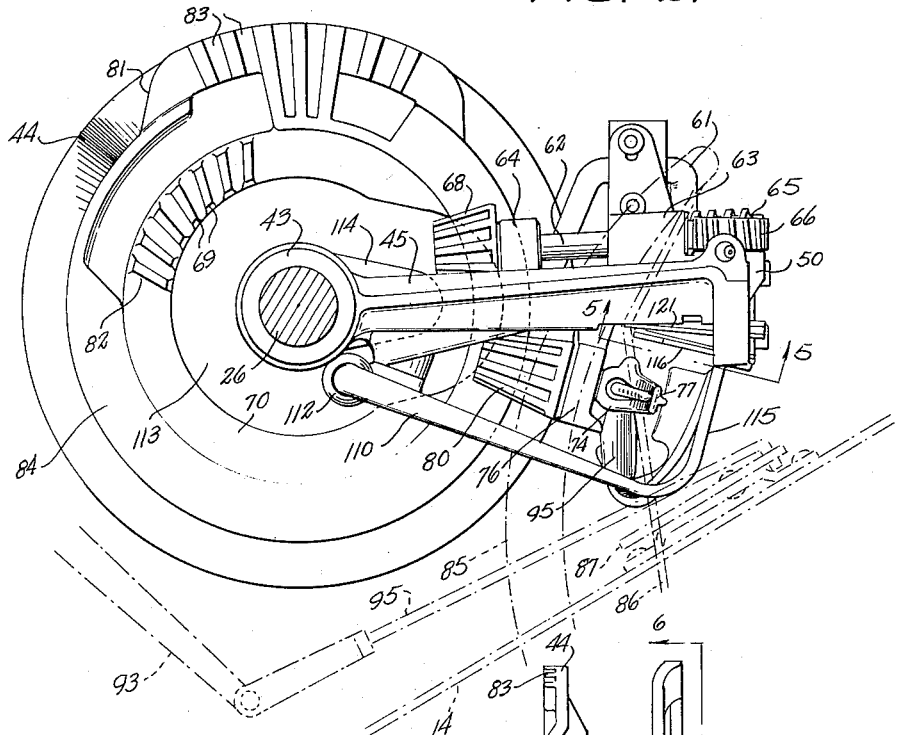

United States Patent Office 2,723,871
Patented Nov. 15, 1955

2,723,871

AUTOMATIC TWINE KNOTTING MECHANISM

Carl S. Rudeen, Brawley, Calif.

Application January 23, 1953, Serial No. 332,937

3 Claims. (Cl. 289—10)

This invention relates to automatic twine tying or knotting mechanisms and more particularly to automatic knotting mechanisms, such as are used on twine tying hay balers.

It is among the objects of the invention to provide an improved twine knotting mechanism for a baling machine which will tie firm knots consistently and substantially eliminate the imperfect knots and misses to which the knotting mechanisms presently in use are subject; which consistently cuts the twine cleanly by shearing action and is effective to cut twine formed from glass fibre or synthetic fibre, such as "Nylon," as well as the conventional twine formed of hemp or sisal fibres; which holds the twine ends firmly in the twine holder during the formation of a bale in the machine, but loosens the grip of the twine holder on the twine during the time the knot is being tied in the twine sufficiently to permit enough twine for the knot to pull through the holder without breaking or unduly straining the twine; which secures the twine against slipping around and off of the knot tying billhook before the knot is completed by the billhook; which permits the twine to be tensioned to a taut condition immediately before and during the time the knot is being tied, so that both ends of the twine can be brought firmly against the billhook and held in proper position without one end of the twine passing over the end of the billhook and without danger of breaking or overstraining the twine; which enables a baler to successfully use twine of somewhat inferior quality having irregularities and portions of unequal strength therein; which may comprise a knotting mechanism of well known construction having improvements at specified locations thereon; and which improvements are easy and economical to incorporate in a twine knotting mechanism and provide a knotting mechanism of greatly increased efficiency and effectiveness.

Other objects and advantages will become apparent from a consideration of the following description and the appended claims in conjunction with the accompanying drawings wherein:

Figure 1 is a top plan view of a fragmentary portion of a hay baler showing the twine tying mechanism of the baler and a portion of the bale chamber on which the tying or knotting mechanism is mounted;

Figure 2 is a cross sectional view on an enlarged scale of the knotting mechanism taken on the line 2—2 of Figure 1;

Figure 3 is a fragmentary side elevational view of the knotting mechanism looking at the right-hand side of the mechanism as illustrated in Figure 2;

Figure 4 is a fragmentary bottom plan view of the knotting mechanism;

Figure 5 is a fragmentary cross sectional view on the line 5—5 of Figure 2;

Figure 6 is a cross sectional view on the line 6—6 of Figure 3;

Figure 7 is a perspective view of a modified billhook constituting an operative component of the knotting mechanism; and Figure 8 is a perspective view of a fixed twine severing knife blade also constituting an operative component of the knotting mechanism.

With continued reference to the drawings, the numeral 10 generally indicates the bale chamber structure of a baling machine and the numeral 11 indicates a twine knotting mechanism mounted on the top of the bale chamber. While in the illustrated arrangement, the knotting mechanism is mounted on the top of the bale chamber and the twine carrying needles are mounted at the bottom of the bale chamber and carry the twine upwardly through the bale chamber to the knotting mechanism upon the completion of a bale in the bale chamber, it is to be understood that in existing baling machines the knotting mechanism may be mounted either on the top of the bale chamber or on one side of the bale chamber and that the location of the knotting mechanism relative to the bale chamber in no way affects the scope of the present invention.

The bale chamber has longitudinally extending top side rails 12 and 13 of right angular cross sectional shape disposed in spaced apart and substantially parallel relationship to each other and includes a cover or platform 14 extending between the top side rails below the knotting mechanism 11, the platform 14 being provided with spaced apart slots 15 and 16 through which the twine carrying needles pass from the lower side of the bale chamber to the knotting mechanism.

As hay balers tie two strands of twine about each bale, there are two twine carrying needles movable, one through the slot 15 and one through the slot 16, and the knotting mechanism is provided in duplicate to tie both of the strands of twine at the same time.

The knotting mechanism 11 comprises a frame 18 of rectangular shape including an end member 19 of channel shape mounted on the side rail 12 of the bale chamber and an end member 20 of Z cross sectional shape having a portion 21 mounted on the bale chamber rail 13 and a portion 21' disposed above and outwardly of the rail 13 and connected to the portion 21 by a web 20'. The frame further includes side members 22 and 23 disposed in spaced apart and parallel relationship to each other and joined at their ends to the end members 19 and 20 near the correspondingly opposite ends of the end members.

A bearing pillow 24 is mounted on the end member 19 of the frame 18 and a similar bearing pillow 25 is mounted on the end member portion 20, the bearing pillows 24 and 25 being in alignment with each other transversely of the bale chamber 10. A drive shaft 26 extends through and is journaled in the bearing pillows 24 and 25 and, at the outer side of the bearing pillow 25, a thrust washer 27 surrounds the shaft and bears against the adjacent side of the bearing pillow. A nut 28 is threaded onto the shaft to hold the shaft against longitudinal movement in one direction relative to the bearing pillow 25.

A clutch 30 is mounted on the shaft 26 at the outer side of the bearing pillow 24 and includes a clutch element 31 drivingly connected to the shaft and a clutch element 32 journaled on the shaft and carrying a chain sprocket 33. A drive chain 34 drivingly connects a power driven component of the baling machine to the sprocket 33, so that this sprocket, together with the associated portion 32 of the clutch, is constantly driven. A trip finger 35 projects from the clutch part 31 and is normally held against movement by a latch arm 36 supported on an arbor 37 mounted on the end member 19 of the mechanism frame 11. The latch arm 36 is operated by a bale measuring mechanism, not illustrated, but of well known construction, to release the clutch trip finger 35 each time a bale is completed in the bale chamber and the clutch then carries the shaft 26 through one complete rotation and is again disengaged by the re-engagement of the trip finger 35 with the latch arm 36 when the single rotation of the drive shaft, as provided by the clutch, has been completed. A nut 38 is threaded onto the drive shaft 26 at the outer side of the clutch 30 and a spacer 39 surrounds the drive shaft between the clutch and the outer side of the bearing pillow 24, so that the nut 38 also holds the shaft against longitudinal movement in one direction relative to the bearing pillows, the nuts 28 and 38 acting to hold the shaft against longitudinal movement in either direction.

Knot tying devices, as generally indicated at 40 and 41, are mounted on the shaft 26 between the bearing pillows 24 and 25, and an eccentric cam 42 is mounted on the shaft between the knot tying mechanism 41 and the inner side of the bearing pillow 25 for a purpose to be presently described.

Since the two knot tying devices 40 and 41 are duplicates, a detailed illustration and description of one only is considered sufficient for the purposes of the present disclosure, and the device 41 has been selected for such detailed illustration and description.

The twine tying device 41 comprises a device frame 45 supported at one end on the side member 22 of the mechanism frame 18 by an arm 46 extending from the frame 45 and secured to the frame member 22 and has at its other end an elongated sleeve 43 having a bore through which the shaft 26 extends and in which the shaft is rotatable. The frame 45 surrounds an opening or eye 47 through which the free end of the corresponding twine carrying needle passes when the needle brings the twine to the knotting mechanism and the frame is provided with bearing formations for the several movable components of the device, as will later appear.

A gear body 44 is mounted on the drive shaft 26 between the cam 42 and the adjacent end of the frame sleeve 43 and is drivingly connected to the drive shaft for driving the twine tying device 41 when the drive shaft is rotated by the one rotation clutch 30.

A twine holder 48 is mounted on the frame 45 and includes a shaft 49 journaled in a bearing formation 50 on the frame 45 and a disc 51 of substantially circular shape centrally mounted on the shaft 49 and having peripheral notches 52 at substantially uniform angular intervals therearound. A plate 53 overlies one side of the disc 51 and is provided with an aperture receiving the shaft 49, and a second disc 51' is mounted on the shaft 49 at the opposite side of the plate 53 from the disc 51 and is provided with peripheral notches registering respectively with the notches in the disc 51. At one end the plate is attached to the frame 45, as indicated at 54 in Figure 5, and the other end of the plate is curved and disposed inwardly of the corresponding portion of the edges of the discs 51 and 51'. A clamp arm 56 of U-shaped cross section is pivotally mounted at one end on the knotter frame 45, as indicated at 58 in Figure 5, and has a portion 59 provided with concavely curved edges which are disposed at respectively opposite sides of the disc 51 and one of which is opposed to the convexly curved edge of the plate 53 remote from the plate mounting 54 to clamp a twine end between the concavely curved edges of the arm and the opposed edge of the plate 53. A compression spring 60, as shown in Figures 4 and 5, bears at one end against the clamp arm 56 intermediate the length of the clamp arm and at its other end against a movable abutment 61, and this spring resiliently urges the clamp arm 56 into clamping relationship with the adjacent edge portion of the plate 53.

A shaft 62, Figures 1 and 2, disposed at an angle to the shaft 49, is journaled in bearing formations 63 and 64 on the knotter device frame 45 and carries a worm 65 at its end nearest the shaft 49. A worm gear 66 is mounted on the end of shaft 49 remote from disc 51 and meshes with the worm 65 to drivingly connect the shaft 62 to the shaft 49 and rotate discs 51 and 51'. A beveled gear 68 having a flat on one side thereof is mounted on shaft 62 at the end of this shaft remote from the worm 65 and the gear body 44 has on the side thereof adjacent the knotter device frame 45 a partial face gear including face gear teeth 69, Figure 2, extending over a predetermined angular extent and a flat annular cam surface 70 extending over the remainder of the angular extent of the face gear from one end to the other end of the gear tooth formation 69. The flat of the gear 68 rides on the cam surface 70 and holds the shaft 62 against rotation, except when the teeth of the beveled gear 68 are in mesh with the face gear teeth 69.

The twine holder holds the free end of the associated twine between the clamp arm 56 and the plate 53 while a bale is being formed in the bale chamber and the notched discs 51 and 51' are effective to move the needle carried portion of the twine also into clamping engagement between the clamp arm 56 and plate 53 when a bale is completed in the bale chamber and just before the knot in the twine is tied, so that both ends of the twine are held in the twine holder at the time the knot is tied in the twine.

The knot tying element of the knotter device comprises a billhook 74, as shown in Figures 2 and 4, of well known construction and operation, having a shank 75 journaled in a bearing formation 76 on the knotter device frame 45, and a head disposed adjacent the twine holder 48 and including a curved hook 77 constituting a fixed jaw and a movable jaw 78 pivotally mounted in the head for cooperation with the fixed jaw to grip twine ends between the jaws and carrying a cam following roller 79 on its end remote from the hook 77.

A beveled gear 80 is mounted on the billhook shank at the end of the bearing formation 76 remote from the billhook head and has a flat in the gear tooth formation thereof. The gear member 44 provides a second partial face gear 81 surrounding the face gear 82 including the gear teeth 69 and annular cam surface 70. The outer face gear 81 includes gear teeth 83 extending over a predetermined angular extent of this face gear and adapted to mesh with the teeth of the beveled gear 80, and a flat annular cam surface 84 extending around the remainder of the angular extent of the face gear 81 from one end to the other end of the formation providing the gear teeth 83. The flat of the beveled gear 80 rides on the flat annular cam surface 84 and holds the billhook against rotation except when the teeth 83 of the face gear 81 are in mesh with the teeth of the beveled gear 80.

The number of teeth 83 in the face gear 81 and the number of teeth on the cooperating beveled gear 80 are just sufficient to impart one complete rotation to the billhook 74 each time the shaft 26 imparts one complete rotation to the gear body 44.

The teeth 83 of the face gear 81 are disposed rearwardly of most of the teeth 69 of the face gear 82 in the direction of rotation of the gear element 44, so that the twine holder will be actuated to grasp both sides of the twine to be tied together before the billhook is rotated to tie the twine.

When a bale is completed in the bale chamber and the clutch 30 engaged, the twine carrying needle 85 for the knotter unit 41 is swung upwardly through the bale chamber 10 and through the opening 47 in the knotter device frame 45 carrying the twine 86 which extends around the newly formed bale from the twine end already gripped in the twine holder to the holder and the holder then acts to also grasp the twine part 86. While the needle is near its upper position, a twine finger 87 pivotally mounted on the platform 14 engages the twine part 86 extending downwardly from the upper end of the needle at the concave side of the longitudinally curved needle and pulls this twine part firmly against the side of the movable jaw 78 of the billhook remote from the fixed jaw 77, the twine end portion extending from the twine holder being already in position against this outer side of the movable jaw of the billhook. As the needle moves upwardly past the knot holder, the needle carried portion of the twine is engaged in one pair of registering notches in the twine holder disc and, as the needle returns downwardly past the knot holder this portion of the twine is also engaged in a second mutually registering pair of notches in the twine holder disc, so that the needle carried portion of the twine is engaged at two spaced apart locations by the knot holder.

There is a twine finger for each of the knotter devices 40 and 41, pivotally mounted at appropriate positions on the platform 14. A shaft 90, Figure 1, spaced from and substantially parallel to the shaft 26, is journaled in bearing structures, not illustrated, mounted on the frame end members 19 and 20, and carries an arm 91 projecting radially therefrom and bearing against the peripheral surface of the eccentric cam 42 to impart a rocking movement to the shaft 90 upon rotation of the cam with the drive shaft 26. Arms 92 and 93 project from the shaft 90 at spaced apart locations intermediate the length of this shaft and adjustable length links, one of which is illustrated and indicated at 94, connect the arms 92 and 93 respectively, with the corresponding twine fingers.

After both of the twine ends to be tied together are brought against the movable jaw of the billhook, the billhook rotates and wraps the twine portions about the head of the billhook. As the billhook rotates, the cam follower 79 on the movable jaw 78 moves along a cam track 95 resiliently mounted on the device frame 45 and over a cam formation on the billhook bearing 76, as shown in Figure 4, and forces the jaws to open as the outer ends of the jaws approach the twine portions disposed between the twine holder and the billhook head to receive these portions of the twine between the jaws and to then close to grasp the twine and pull the twine ends through the loop wrapped around the billhook head when the knot is completed.

If the twine ends are gripped at all times by the twine holder with sufficient force to prevent the bale pressure on the twine, as the bale is being formed, from pulling the severed end of the twine out of the twine holder, then, as the billhook wraps the twine around the billhook head to form the knot loop, sufficient tension will frequently be applied to the twine portions between the billhook head and the twine holder to break one or both of these twine portions and cause the billhook to fail to make a complete knot. In order to overcome this malfunctioning of the knotting mechanism, the present invention provides means for releasing the pressure of the twine holder on the twine while the knot is being formed by the billhook to an extent such that the billhook can slip enough twine through the holder to form the loop around the billhook head without any danger of breaking the twine, and then restoring the full holding pressure on the severed twine end during the time the next succeeding bale is being formed in the bale chamber of the machine.

The means varying the pressure of the twine holder 48 on the associated twine in timed relationship to the operation of the billhook 74 includes a cam 100, of circular shape, centrally mounted on the shaft 26 at the side of the gear member 44 remote from the knotter device frame 45. The cam 100 has a flat, annular cam surface 101 disposed in a plane substantially perpendicular to the rotational axis of the drive shaft 26, and a dwell 102 extending over a predetermined angular extent of the circular cam and offset from the plane of the cam surface 101. The movable abutment 61, Figures 5 and 6, is a somewhat U-shaped structure having its intermediate or bight portion 103 journaled in a bearing formation 104 on the knotter device frame 45 and having at the distal end of one leg 105 thereof a spring seat 106 receiving the adjacent end of the spring 60. A cam following roller 107 is journaled on the distal end of the other leg 108 of the abutment structure and rides on the cam surface of the rotatable cam 100. A strut 109, Figure 6, extending between the legs 105 and 108 of the abutment structure 61 reinforces the abutment structure and renders it substantially rigid.

While the cam follower 107 rides on the flat cam surface 101 of the cam 100, the spring 60 is maintained compressed and full pressure is applied by the twine holder to the associated twine. When the follower 107 is in the dwell 102 of the cam, however, the loading on spring 60 is reduced and the pressure exerted on the twine by the twine holder relieved. The dwell 102 of the cam 100 is rotationally related to the shaft 26, so that the cam follower 107 is in the cam dwell 102 while the billhook 74 is rotating to wrap the twine about the billhook head to form the knot loop.

After the knot has been tied by the billhook, both strands of the twine held by the twine holder are severed adjacent the bill hook, freeing both ends of the twine in which the knot is formed, and leaving one end of the severed twine portion engaged in the twine holder.

An elongated and longitudinally curved blade carrier 110 is pivotally mounted intermediate its length on the knotter device frame 45 by a pivotal mounting 111, as shown in Figures 2 and 3, and has on one end a cam following roller 112 disposed in a cam groove 113 in the gear body 44 and moved by a cam lobe 114 in the groove 113 to swing the carrier 110 about the axis of the pivotal mounting 111. A formation 115 on the end of the carrier 110 remote from the cam follower 112 carries a twine severing blade 116 and a wiper element 118 which pushes the knot loop off of the jaws of the billhook when the twine is severed by the blade 116. When the twine is severed and the loop is pushed off of the billhook jaws the free ends of the twine are grasped by the billhook jaws and are then pulled through the loop to form the knot.

The formation 115 is bifurcated to provide a notch 119, Figure 3, receiving the corresponding twine finger 87 when the latter moves the needle carried twine against the billhook, and a twine finger 120 which cooperates with the twine finger in properly positioning the needle carried portion of the twine.

It frequently happens that, for various reasons, such as the slackness of the twine or the dullness of the knife blade 116, this blade does not sever both strands of the twine when the knot is formed. If the end of the twine held by the twine holder, particularly, is not severed, this end is pulled out of the twine holder by the wiper element and is too long to be pulled entirely through the knot loop wrapped around the head of the billhook when this loop is pulled by the wiper element 118 off of the billhook head and over the billhook jaws. This results in a bow knot being tied by the billhook. Frequently the bow of such a bow knot is held so firmly between the billhook jaws that when the knot is pulled off of the billhook and the twine subjected to tension by the forward movement of the bale, the twine will be broken and the bow portion of the knot left between the billhook jaws. This will cause the knotter to continue to miss the knots until this broken off piece of twine is removed from the billhook.

The present invention eliminates this deficiency of the existing mechanism by providing a fixed knife blade 121 rigidly mounted on the knotter device frame 45 in position such that it is overlapped by the movable blade 116 when the latter is moved to its twine severing position and the cutting edges of the movable and fixed blade are mutually opposed to provide a shearing action on the twine which will not only infallibly sever ordinary twine formed of sisal or hemp fibers, but also will sever twine of hard or tough fibre, such as glass or synthetic material fibre.

At the time the twine is severed by the knife mechanism, above described, it extends around the newly formed bale, around the head of the billhook and between the billhook jaws. When the twine is severed the holding effect of the twine holder is eliminated while, at the same time, the newly formed bale exerts a heavy pressure on the twine tending to upwrap the twine from around the billhook head and to pull the ends of the twine from between the billhook jaws. If this happens, as it frequently does with the billhooks currently in use, the knot will be missed.

In order to overcome this tendency the present invention provides a modified billhook, shown in Figure 7, having in the outer surface of the fixed jaw or hook formation thereof, longitudinally extending grooves, as indicated at 97 and 98, disposed at respectively opposite sides of a longitudinally extending central ridge or rib 99 having definite edges.

This construction increases the frictional resistance to pulling of the twine loop around the billhook to such an extent that missed knots caused by the bale pressure pulling the twine ends around the billhook and unwrapping the knot loop when the twine ends are severed, is substantially eliminated.

The present invention thus comprises various improvements to an existing knotter mechanism, including the cam means varying the pressure exerted by the twine holder on the twine in timed relationship to the operation of the knot forming billhook, the friction increasing formation on the outer surface of the billhook, and the fixed knife blade cooperating with the movable knife blade to provide a shearing action on the twine, and all of these improvements cooperate with each other and with parts of the existing mechanism to eliminate the failures of the mechanism to form complete knots which stay tied.

*Operation*

When a blade has been completely formed in the bale chamber 10, as indicated by the associated bale measuring wheel, not illustrated, the clutch latch lever 36 is moved to release the clutch finger 35 and engage the one rotation clutch 30 to turn the shaft 26 through one complete rotation and then stops the shaft. Suitable mechanism, not illustrated, connects the shaft 26 to the twine carrying needles so that, as the shaft turns, the needles are moved through the bale chamber and the free ends of the needles carrying the twine which extends from the twine holders 48 around the bale and over the free ends of the needles back to the twine balls, to the twine holders. The twine holders are now driven by the shaft 26 to engage the portions of the twine carried to the holders by the corresponding needles, the holder spring 60 being under full compression at this time. Just as the holders grip the needle carried twine, the twine fingers 87 are actuated to move both the needle carried twine portions and the portions of the twine extending from the twine ends held in the twine holders against the movable jaws 78 of the billhooks 74 of the duplicate knot tying devices 40 and 41.

The billhooks are now rotated to wrap both twine portions associated with each billhook around both inner and outer billhook jaws to provide the knot loops. As the billhooks are turning to wrap the knot loops, the dwell 102 of the cam 100 comes under the cam following roller 107 on the movable abutment leg 106, partially unloading the twine holder spring 60 and relieving the pressure of the twine holders on the twine portions engaged thereby, so that enough twine can be pulled through the twine holders to form the loops around the billhook jaws, and eliminate knot misses caused by breaking of the twine on or adjacent the billhooks.

Immediately after the twine portions have been wrapped around the billhook jaws, the cam followers 107 ride out of the cam dwells 102 onto the flat cam surfaces 101 and full pressure of the twine holders on the associated twine portions is restored.

As the twine wraps around the billhook jaws, the resiliently mounted cam tracks 95 and the complementary cam formations on the billhook bearings acting on the cam followers 79 carried by the movable billhook jaws, first move the movable jaws away from the fixed jaws to open the jaws and receive the twine portions extending between each billhook head and the associated twine holder between the corresponding jaws, and then close the jaws to grasp the corresponding twine portions therebetween, and the billhooks are brought to their original position and stopped.

As soon as the billhooks have completed a single rotation, the blade carriers 110 are moved by the cams 113 acting on the cam followers 112 to sever both portions of the twine between the billhook heads and the corresponding twine holders, leaving the ends of the twine engaged in the holders, so that the twine extends from the holders through the bale chamber and the needles to the twine balls. It is at this time, principally, that the groove and ridge formations on the modified billhooks become effective to restrain the twine from pulling around the billhook jaws and pulling the twine ends, released from the twine holders by the severing of the twine, from between the billhook jaws by which they are grasped, thus substantially eliminating misses caused by the failure of the billhooks to pull the twine ends through the knot loop.

At the same time, wiper elements on the blade carriers push the knot loops off of the billhook jaws and the jaws pull the twine ends grasped thereby through the corresponding loops to form the knots, the wiper elements moving the twine ends from between the billhook jaws and tightening the knots, if no bow knots, as explained above, have been formed.

If the twine is not completely severed by the twine severing blade, the ends cannot be pulled entirely through the knot loop and a bowknot will result which will usually cause the twine to be broken when the knot is pulled out of the billhook jaws.

By providing the fixed blade which cooperates with the movable blade in the manner of scissor blades to cut the twine by a shearing action, the twine is infallibly severed even though the blades may be somewhat dulled or the twine slack, thus substantially eliminating the occurrence of misses caused by bowknots.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a twine knotting mechanism for a baling machine, a rotatable twine holder adapted to receive twine from an associated twine carrying needle and including a spring biased twine clamping arm, an abutment operatively connected to said spring biased clamping arm and movable relative to said holder, a rotatable twine tying billhook arranged adjacent the twine holder, means periodically rotating said holder and said billhook in timed relationship to each other, means operatively connected to said abutment and operated by the first named means in timed relationship to the rotation of said billhook to thereby reduce the spring pressure of said twine clamping arm during the rotation of said billhook and enable said billhook to pull through said twine holder a portion of twine sufficient to form a knot loop around said billhook, and twine shearing means including a fixed knife blade and a cooperating knife blade movable into shearing contact with said fixed blade by said first named means to sever the twine between said billhook and said twine holder after a knot loop has been formed around said billhook.

2. In a twine knotting mechanism for a baling machine, a rotatable twine holder adapted to receive twine from an associated twine carrying needle and including a spring biased twine clamping arm, an abutment operatively connected to said spring biased clamping arm and movable relative to said holder, a rotatable twine tying billhook arranged adjacent the twine holder, means periodically rotating said holder and said billhook in timed relation to each other, means operatively connected to said abutment and operated by the first named means in timed relation to the rotation of said billhook to thereby reduce the spring pressure of said twine clamping arm during the rotation of said billhook and enable said billhook to pull through said twine holder a portion of twine sufficient to form a knot loop around said billhook, and twine shearing means including a fixed knife blade and a cooperating knife blade movable into shearing contact with said fixed blade by said first named means to sever the twine between said billhook and said twine holder after a knot loop has been formed around said billhook, said billhook having on the external surface thereof a friction increasing formation to restrain said knot loop from pulling around and off of said billhook.

3. In a twine knotting mechanism for a baling machine, a rotatable twine holder adapted to receive twine from an associated twine carrying needle and including a spring biased twine clamping arm, an abutment operatively connected to said spring biased clamping arm and movable relative to said holder, a rotatable twine tying billhook arranged adjacent the twine holder, means periodically rotating said holder and said billhook in timed relation to each other, means operatively connected to said abutment and operated by the first named means in timed relationship to the rotation of said billhook to thereby reduce the spring pressure of said twine clamping arm during the rotation of said billhook and enable said billhook to pull through said twine holder a portion of twine sufficient to form a knot loop around said billhook, and twine shearing means including a fixed knife blade and a cooperating knife blade movable into shearing contact with said fixed blade by said first named means to sever the twine between said billhook and said twine holder after a knot loop has been formed around said billhook, said billhook having on the external surface thereof a friction increasing formation including at least a pair of longitudinally extending parallel grooves and a longitudinally extending rib positioned between said grooves and projecting from said billhook to restrain said knot loop from pulling around and off of said billhook.

References Cited in the file of this patent

UNITED STATES PATENTS

| | | |
|---|---|---|
| 257,837 | Appleby | May 16, 1882 |
| 419,154 | Miller | Jan. 7, 1890 |
| 744,153 | Appleby | Nov. 17, 1903 |
| 1,184,794 | Velen | May 30, 1916 |
| 2,644,703 | Rudeen | July 7, 1953 |